Oct. 31, 1961    N. R. POHL ET AL    3,006,606
LEVELING DEVICE
Filed Dec. 3, 1959    2 Sheets-Sheet 1
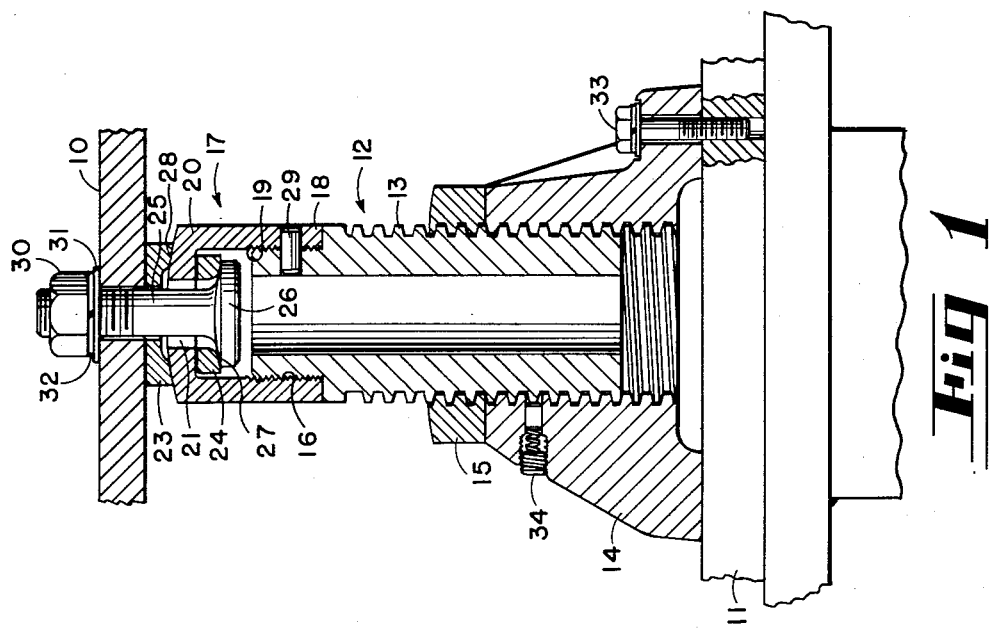
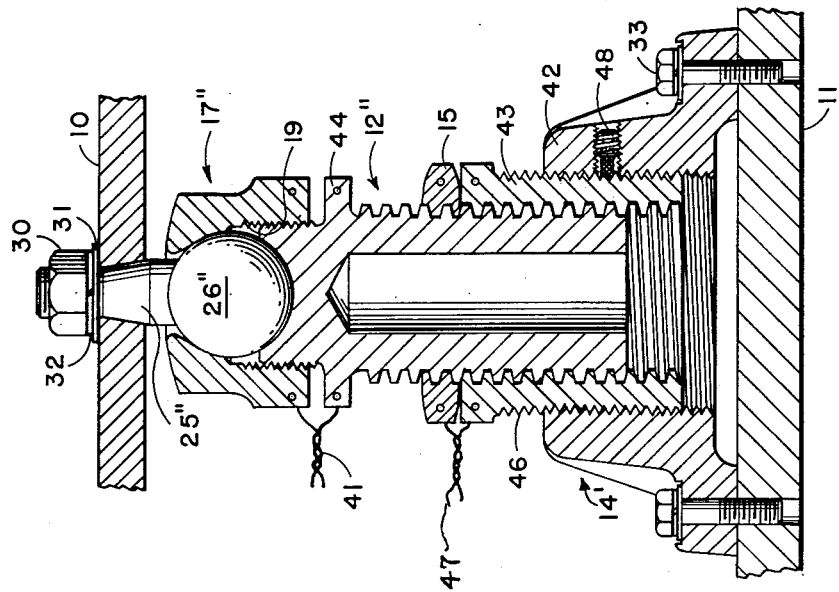
INVENTORS.
NORMAN R. POHL.
BY ROBERT H. KNESE.
ATTORNEYS.

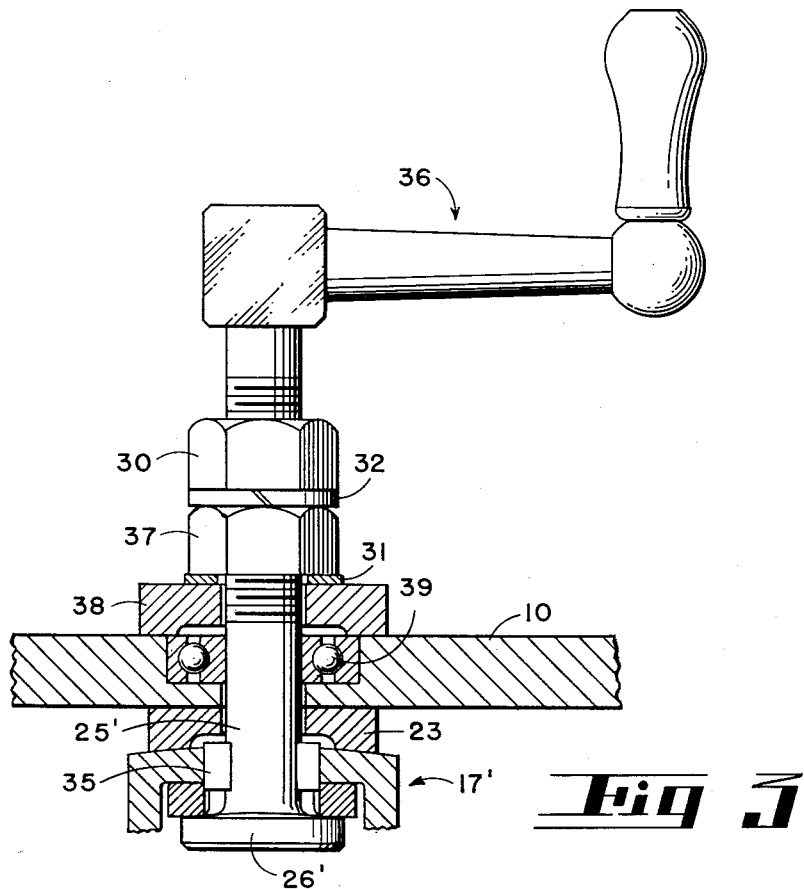
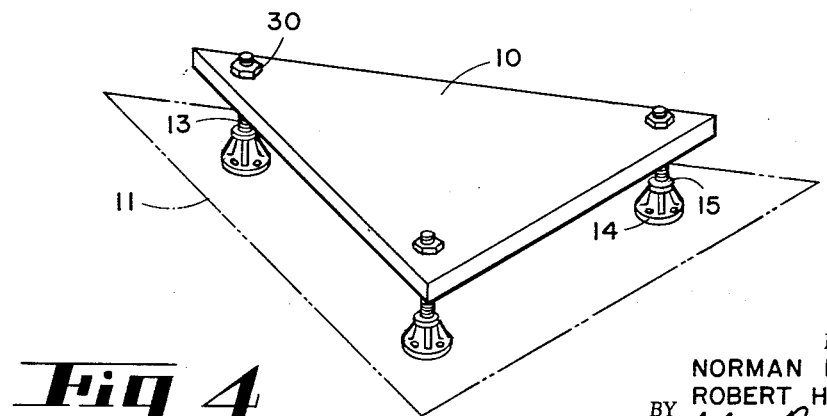

United States Patent Office 3,006,606
Patented Oct. 31, 1961

3,006,606
LEVELING DEVICE
Norman R. Pohl, Miamiville, and Robert H. Knese, Cincinnati, Ohio, assignors to Avco Corporation, Cincinnati, Ohio, a corporation of Delaware
Filed Dec. 3, 1959, Ser. No. 857,206
1 Claim. (Cl. 254—101)

The present invention relates to leveling devices, and specifically to a radar antenna platform featuring novel jack screw levelers arranged to support heavy loads and accurately to level the platform by coarse and vernier adjustments. The invention is of particular utility in maintaining radar antenna installations at a desired level, and in fast, precise setup of radar antenna platforms.

An object of the invention is to provide a radar antenna platform in which accurate leveling is easily and rapidly accomplished by coarse and vernier adjustments.

Another object of the invention is to provide a novel jack screw leveler accurately adjustable to support a platform in a desired relationship to ground or other foundation. A further object of the invention is to incorporate in such levelers self-aligning strain-relieving means.

For a better understanding of the present invention, together with other and further objects, advantages, and capabilities thereof, reference is made to the following description of the accompanying drawings, in which:

FIG. 1 is a cross-sectional view, taken centrally along the longitudinal axis, of a preferred form of leveler in accordance with the invention;

FIG. 2 is a cross-sectional view, taken centrally along the longitudinal axis, of a modified form of leveler in accordance with the invention;

FIG. 3 is a cross-sectional view, taken centrally along the longitudinal axis, of a crank drive which may optionally be employed to drive the coarse adjusting means illustrated in FIG. 1; and FIG. 4 is a perspective view of a platform installation in accordance with the invention, including a plurality of levelers located at the corners of the platform for establishing with precision and rapidity the level thereof.

Referring now specifically to FIG. 1, there is shown a preferred form of leveler for supporting a radar antenna platform member 10 relative to a foundation or other ground member 11. This leveler comprises the combination of a hollow, thick-walled, cylindrical, metallic jack screw 12 having coarse external threads 13 formed on its outer surface; a large hollow nut 14 secured by complementary internal screw threads to the jack screw 12 to provide coarse positional adjustment of the jack screw relative to the foundation as the jack screw is turned; and a traveling lock nut 15 having internal threads complementary to the threads 13 and adapted to be adjustably frictionally locked to the nut 14 to provide fine additional adjustment of the jack screw relative to the foundation 11 as the lock nut is turned. Additionally, the combination includes swivel means securing the jack screw to the platform member 10. That is to say, the jack screw is provided with fine external threads 16 complementary to the internal threads of a collar-type nut 17. The member 12 is referred to in the claim as "the lower jack screw member," and the member 17 is referred to in the claim as "the upper jack screw member." This collar-type nut is formed with an axially extending portion 18, internally threaded at 19, and with a flange portion 20 apertured at 21. Projecting through the aperture 21 and also through registering apertures in platform 10 and in large metallic washers 23 and 24 is a mushroom member or bolt having a stem 25 and a head 26. Washer 24 is located between flange 20 and head 26. The surfaces of head 26 and flange 20 which abut against washers 24 and 23, respectively, are formed with arcuate convexities or spherical radii, as indicated at 27 and 28, respectively, to provide for swivel action, in the sense that the axis of members 17 and 12 may tilt relative to the platform to provide self-alignment and strain relief. Washer 23 is hereinafter referred to as "the first washer," and washer 24 as "the second washer." The lower surface of washer 23 is concave, and the upper surface of the upper jack screw member 17 is convex. A set screw 29 projects through the screw-threaded portions of members 12 and 17 to lock them together. The upper end of stem 25 is threaded for security by a nut 30, and between this nut and platform 10 are inserted washer 31 and lock washer 32.

The foundation nut 14 is secured to the foundation 11 as by a plurality of foundation screws, set in the foundation, and bolts 33 or other suitable expedient. A spring-biased dowel pin 34 provides a stop to prevent jack screw 12 from being completely withdrawn from nut 14.

Coarse adjustments are made by turning the jack screw member 12. The threaded fit of members 12 and 14 is made loose. The abutting surfaces of the nuts 14 and 15 are fabricated of metals which tend to frictionally lock, or are abraded in order to provide a high coefficient of friction. Fine adjustment is provided by turning lock nut 15 in order to shift the jack screw 12 within the limit of thread play established by the loose fit mentioned above.

By reason of the above-mentioned concavities, jack screw 12 is self-aligned, thereby compensating for departures in parallelism of the foundation and platform and relieving stresses and strains.

In the embodiment of FIG. 3, the jack screw is turned, not directly, but indirectly via the upper jack screw member or collar nut 17', key 35, stem 25' of the mushroom member or bolt, and crank 36. Prime designations are appended to the reference numerals of the FIG. 3 embodiment to indicate that the elements so primed correspond to elements designated with like reference numerals in FIG. 1, and differ only in respects which adapt them to association with the crank 36. In FIG. 3 stem 25' is keyed onto collar nut 17' by a key member 35, and crank 36 is rigidly secured to the upstanding end of stem 25', which stem projects through lock nut 30, lock washer 32, nut 37, washer 31, and an additional flanged washer member 38. An annular ball bearing and race device 39 is inset into platform 10 to facilitate the rotary adjustment effected by the turning group comprising crank 36, the mushroom or bolt, key 35, upper jack screw member or collar nut 17', lower jack screw member 12, and dowel pin 29.

Reference is now made to FIG. 2, representing a modified form of leveler in accordance with the invention. In the FIG. 2 embodiment the mushroom comprises a stem 25" and a spherical head 26" which fits for angular positioning within complementary spherical surfaces formed on the upper interior of collar nut 17". The advantage of this construction is that it dispenses with the washers 23 and 24. Collar nut 17" is internally threaded to engage complementary external threads on jack screw 12", and these two members are locked together by a suitable locking wire arrangement 41. This embodiment includes a lock nut 15 internally threaded to turn on threads 13.

Another major difference between the FIG. 2 embodiment and the FIG. 1 embodiment resides in the fact that the massive nut 14' is broken into two components: a nut 42 which is internally finely threaded, and a sleeve 43 which is externally finely threaded to complement nut 42 and internally coarsely threaded to complement threads 13 on jack screw 12". In this embodiment the coarse adjustment is made by turning enlarged portion 44 of jack screw 12", and the fine adjustment is made by turning sleeve 43, which is provided with an enlarged portion for that purpose adjacent lock nut 15. The fine threads on the sleeve are shown at 46. In a representative embodiment in accordance with FIG. 2, the lift of the coarse threads is one inch per three turns, and that of the fine threads 46 is one inch per eight turns. The locking nut 15 is secured to the sleeve 43 as by a locking wire 47. Set screw 48 is provided to lock sleeve 43 in position.

In FIG. 4 there is illustrated a platform 10 in association with three levelers in accordance with the FIG. 1 embodiment.

It will be understood that the position of the leveler may be inverted, with the massive nut portion 14 or corresponding part in contact with the platform 10 and with the mushroom stem projecting through the foundation member. The foundation or ground is referred to in the claims as the "ground member."

It will also be understood that any of the members which are turned to provide adjustment may be driven by worm gear drives.

While there has been shown and described what is at present considered to be the preferred embodiment of the invention, it will be understood by those skilled in the art that various changes and modifications may be made therein without departing from the proper scope of the invention as defined in the appended claims.

Having described our invention, we claim:

In a device for adjustably supporting a radar antenna platform member relative to a ground member, the combination of a hollow externally threaded lower jack screw member, an internally threaded nut formed as a base member secured to the ground member and being adjustably engaged by the jack screw to provide vertical positional adjustment of the jack screw relative to the ground member, a hollow upper jack screw member formed with a downwardly depending nut portion fixedly secured to the jack screw and with an inwardly extending flange, a first washer inserted between said flange and said platform, a bolt having a vertically extending stem projecting through said platform and a head overlapping the lower side of said flange, a second washer inserted between said head and said flange, said first washer and said flange being formed with complementary concave and convex surfaces, respectively, to permit limited tilt of the platform relative to the upper jack screw member, a key securing said flange to said stem for rotation therewith, roller bearing means imbedded in said platform for journaling said stem, lock nut and washer means concentric with said stem and disposed upwardly of said platform for securing said bolt against vertical displacement, and a crank for rotating the subassembly of stem, key, and jack screw members to adjust the vertical position of said platform member.

References Cited in the file of this patent

UNITED STATES PATENTS

| | | |
|---|---|---|
| 842,641 | Fernau | Jan. 29, 1907 |
| 1,874,519 | Haubrock | Aug. 30, 1932 |
| 2,164,609 | Cusick | July 4, 1939 |
| 2,732,177 | Ludowici | Jan. 24, 1956 |
| 2,819,529 | Beck | Jan. 14, 1958 |

FOREIGN PATENTS

| | | |
|---|---|---|
| 252,587 | Italy | Mar. 26, 1927 |
| 543,853 | Great Britain | Mar. 16, 1942 |